(12) United States Patent
Bolton et al.

(10) Patent No.: US 10,782,481 B1
(45) Date of Patent: Sep. 22, 2020

(54) OPTICAL FASTENERS HAVING HEADS WITH LENSES

(71) Applicant: THE BOEING COMPANY, Chicago, IL (US)

(72) Inventors: Joseph Andrew Bolton, Newalla, OK (US); Keith Daniel Humfeld, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 16/351,928

(22) Filed: Mar. 13, 2019

(51) Int. Cl.
*G02B 6/32* (2006.01)
*G02B 6/42* (2006.01)
*G02B 6/38* (2006.01)
*B64C 1/14* (2006.01)

(52) U.S. Cl.
CPC ............ *G02B 6/325* (2013.01); *G02B 6/389* (2013.01); *G02B 6/4204* (2013.01); *G02B 6/4248* (2013.01); *B64C 1/1484* (2013.01)

(58) Field of Classification Search
CPC ...... G02B 6/325; G02B 6/389; G02B 6/4248; G02B 6/4204; B64C 1/1484
See application file for complete search history.

(56) References Cited

U.S. PATENT DOCUMENTS

| | | | | | |
|---|---|---|---|---|---|
| 2,175,719 | A | * | 10/1939 | Long | B24B 9/14 451/240 |
| 2,698,901 | A | * | 1/1955 | Wilkes | H01Q 19/134 343/781 R |
| 3,762,361 | A | * | 10/1973 | Lambiris | F16H 63/42 116/28.1 |
| 3,834,007 | A | * | 9/1974 | Lambiris | F16H 63/42 29/453 |
| 4,659,197 | A | * | 4/1987 | Weinblatt | A61B 3/113 351/158 |
| 4,753,510 | A | * | 6/1988 | Sezerman | G02B 6/3843 385/61 |
| 4,776,663 | A | * | 10/1988 | Malinge | G02B 6/32 385/79 |
| 4,782,430 | A | * | 11/1988 | Robbins | G02B 6/0008 285/136.1 |
| 4,810,053 | A | * | 3/1989 | Woith | G02B 6/322 385/79 |
| 4,820,097 | A | * | 4/1989 | Maeda | F02K 1/80 165/134.1 |
| 5,080,542 | A | * | 1/1992 | Sheahan | E04D 3/3601 411/34 |
| 5,243,681 | A | * | 9/1993 | Bowen | G02B 6/266 359/885 |

(Continued)

*Primary Examiner* — Andrew Jordan
(74) *Attorney, Agent, or Firm* — The Small Patent Law Group LLC; Joseph M. Butscher (57) ABSTRACT

A fastener includes a head that is configured to be engaged by a tool, and a shaft extending from the head. The shaft includes a distal end that is opposite from the head. At least one optical component is coupled to one or both of the head or the shaft. The optical component(s) is configured to allow light to pass through the fastener. A window system includes a panel that includes an exterior surface and an interior surface, and the fastener extending between the exterior surface and the interior surface of the panel. A screen is coupled to the interior surface. The screen receives light from the optical component(s) of the fastener.

20 Claims, 5 Drawing Sheets

(56) References Cited

U.S. PATENT DOCUMENTS

| | | | | |
|---|---|---|---|---|
| 5,289,553 | A * | 2/1994 | Ortiz, Jr. | G02B 6/4296 385/33 |
| 5,452,087 | A * | 9/1995 | Taylor | G01L 11/025 250/227.19 |
| 5,511,139 | A * | 4/1996 | Nodfelt | G02B 6/32 385/34 |
| 5,557,099 | A * | 9/1996 | Zielinski | F01D 17/02 250/227.11 |
| 5,588,081 | A * | 12/1996 | Takahashi | G02B 6/32 385/34 |
| 5,638,472 | A * | 6/1997 | Van Delden | G02B 6/32 385/25 |
| 5,675,682 | A * | 10/1997 | De Marchi | G02B 6/3879 385/139 |
| 5,712,940 | A * | 1/1998 | Van Roemburg | G02B 6/4208 385/33 |
| 5,845,036 | A * | 12/1998 | De Marchi | G02B 6/3825 385/139 |
| 6,024,498 | A * | 2/2000 | Carlisle | G02B 6/3869 385/55 |
| 6,196,733 | B1 * | 3/2001 | Wild | G02B 6/3887 385/139 |
| 6,254,418 | B1 * | 7/2001 | Tharp | H01R 13/6335 439/352 |
| 6,605,092 | B2 * | 8/2003 | Grumberg | A61B 17/17 433/76 |
| 6,799,898 | B2 * | 10/2004 | Cheng | G02B 6/3879 385/55 |
| 6,935,042 | B2 * | 8/2005 | Bonham | G02B 6/32 33/645 |
| 6,941,758 | B2 * | 9/2005 | Tiemann | F16B 33/00 411/395 |
| D523,396 | S * | 6/2006 | Shiraishi | D13/133 |
| 7,578,692 | B2 * | 8/2009 | Kaneda | H01R 13/633 439/159 |
| 7,614,094 | B2 * | 11/2009 | Wolfe | G08B 21/082 340/530 |
| 7,628,079 | B2 * | 12/2009 | Sato | G01L 5/24 73/761 |
| 7,699,515 | B2 * | 4/2010 | Faber | F21V 29/004 362/580 |
| 7,758,255 | B2 * | 7/2010 | Jones | G02B 6/3825 385/53 |
| 7,938,567 | B2 * | 5/2011 | Faber | F21V 29/004 362/580 |
| 8,038,354 | B2 * | 10/2011 | Nielson | G02B 6/3878 385/59 |
| 8,229,259 | B1 * | 7/2012 | Uhlhorn | G02B 6/353 385/140 |
| 8,240,988 | B2 * | 8/2012 | Pang | F01D 25/12 411/395 |
| 8,472,761 | B2 * | 6/2013 | Rosenberg | G02B 6/43 362/551 |
| 8,506,174 | B2 * | 8/2013 | Nakagawa | G02B 6/3897 385/55 |
| 8,616,781 | B2 * | 12/2013 | Knapp | G02B 6/32 385/19 |
| 8,840,419 | B2 * | 9/2014 | Huang | H01R 13/6272 439/352 |
| 8,869,784 | B2 * | 10/2014 | LoRocco | F41G 1/467 124/87 |
| 9,151,899 | B2 * | 10/2015 | Takakura | G02B 6/32 |
| 9,222,829 | B2 * | 12/2015 | Saeedkia | H04B 10/80 |
| 9,285,561 | B2 * | 3/2016 | Takakura | G02B 6/3624 |
| 9,563,022 | B2 * | 2/2017 | Takakura | G02B 6/3624 |
| 10,151,882 | B2 * | 12/2018 | Zhong | G02B 6/32 |
| 2003/0100908 | A1 * | 5/2003 | Grumberg | A61B 17/17 606/96 |
| 2004/0047565 | A1 * | 3/2004 | Cheng | G02B 6/3879 385/71 |
| 2005/0081397 | A1 * | 4/2005 | Bonham | G02B 6/32 33/645 |
| 2007/0025677 | A1 * | 2/2007 | Harrison | G02B 6/4471 385/138 |
| 2007/0144267 | A1 * | 6/2007 | Sato | G01L 5/24 73/761 |
| 2007/0211999 | A1 * | 9/2007 | Kobayashi | G02B 6/32 385/79 |
| 2008/0279503 | A1 * | 11/2008 | Jones | G02B 6/3825 385/34 |
| 2009/0042424 | A1 * | 2/2009 | Kaneda | H01R 13/633 439/159 |
| 2009/0064403 | A1 * | 3/2009 | Wolfe | G08B 21/082 4/504 |
| 2009/0067191 | A1 * | 3/2009 | Faber | F21V 29/773 362/580 |
| 2010/0178008 | A1 * | 7/2010 | Nielson | G02B 6/32 385/56 |
| 2010/0220494 | A1 * | 9/2010 | Faber | F21V 29/75 362/580 |
| 2011/0022132 | A1 * | 1/2011 | Kim | A61H 7/006 607/91 |
| 2011/0129184 | A1 * | 6/2011 | Rosenberg | G02B 6/43 385/24 |
| 2012/0002925 | A1 * | 1/2012 | Nakagawa | G02B 6/3897 385/78 |
| 2012/0155807 | A1 * | 6/2012 | Knapp | G02B 6/32 385/61 |
| 2012/0243836 | A1 * | 9/2012 | Kim | G02B 6/0006 385/92 |
| 2014/0086529 | A1 * | 3/2014 | Takakura | G02B 6/32 385/33 |
| 2014/0206227 | A1 * | 7/2014 | Kern | H01R 43/00 439/576 |
| 2015/0086167 | A1 * | 3/2015 | Takakura | G02B 6/3624 385/100 |
| 2015/0086293 | A1 * | 3/2015 | Takakura | G02B 6/3624 411/337 |
| 2015/0204717 | A1 * | 7/2015 | Saeedkia | H04B 10/80 250/227.11 |
| 2018/0045892 | A1 * | 2/2018 | Zhong | G02B 6/32 |
| 2019/0110366 | A1 * | 4/2019 | Gavagnin | B33Y 80/00 |

* cited by examiner

```
┌─────────────────────────┐
│   Coupling at least one │
│ optical component to one│─── 500
│   or both at a head or a│
│          shaft          │
└───────────┬─────────────┘
            ↓
┌─────────────────────────┐
│  Allowing light to pass │
│ through the fastener via│─── 502
│ the at least one optical│
│       component         │
└─────────────────────────┘
```

OPTICAL FASTENERS HAVING HEADS WITH LENSES

FIELD OF THE DISCLOSURE

Embodiments of the present disclosure generally relate to fasteners, and, more particularly, to optically transparent fasteners.

BACKGROUND OF THE DISCLOSURE

Various complex structural systems include numerous components. For example, an aircraft fuselage includes numerous frames, stringers, spars, and the like that covered by panels, skins, and other such covering structures. During a manufacturing process, or subsequent maintenance inspection, interior portions of the aircraft that are covered by covering structures may be inspected. In order to inspect the interior portions, the covering portions are typically removed so that the interior portions, such as the frames, stringers, spars, and the like, may be viewed and assessed. After the interior portions have been inspected, the covering portions are repositioned and secured over the interior portions. As can be appreciated, the process of removing covering portions of the aircraft to inspect interior portions and subsequently re-assembling the covering portions is time- and labor-intensive.

Additionally, various aircraft include window assemblies that extend through portions of a fuselage. The window assemblies and areas of the fuselage surrounding the window assemblies need to be robust and strong enough to withstand forces exerted during a flight of the aircraft. As such, a typical window assembly for an aircraft includes one or more frame portions, one or more transparent windows, and the like positioned within a cutout formed through the fuselage. The various portions of the window are securely connected to the fuselage through numerous fasteners. During a manufacturing process, the windows and fuselage are inspected to ensure structural integrity. The process of securing window assemblies to a fuselage of an aircraft is also time- and labor-intensive.

SUMMARY OF THE DISCLOSURE

A need exists for a system and a method for inspecting internal portions of a structure (such as a portion of an aircraft) without the need for removing covering portions. Further, a need exists for time- and labor-efficient systems and methods for inspecting internal portions of a structure. Also, a need exists for a window system for an aircraft that maintains a high degree of structural integrity and which may be efficiently manufactured.

With those needs in mind, certain embodiments of the present disclosure provide a fastener that includes a head that is configured to be engaged by a tool, and a shaft extending from the head. The shaft includes a distal end that is opposite from the head. At least one optical component is coupled to one or both of the head or the shaft. The optical component(s) is configured to allow light to pass through the fastener.

In at least one embodiment, the optical component(s) includes at least one lens. As an example, the lens is proximate to the head. As another example, the lens is proximate to the distal end. As another example, a first lens is proximate to the head, and a second lens is proximate to the distal end.

In at least one embodiment, the optical component(s) includes a fiber optic member extending along at least a portion of a length of the fastener. In at least one embodiment, the optical components include a fiber optic member extending through a central channel of the fastener that extends between the head and the distal end, and a lens proximate to the head or the distal end. The lens is configured to focus light into a light-receiving end of the fiber optic member. In at least one example, the fiber optic member is separated from the lens within the central channel by a space.

One or both of the head or the distal end may include an imaging device coupler that is configured to removably couple to a portion of an imaging device.

Certain embodiments of the present disclosure provide a method of forming a fastener. The method includes coupling at least one optical component to one or both of a head or a shaft. The head is configured to be engaged by a tool. The shaft extends from the head, and includes a distal end that is opposite from the head. The method also includes allowing light to pass through the fastener via the at least one optical component.

In at least one embodiment, the method includes providing the at least one optical component as at least one lens. The method may include providing the at least one lens proximate to the head. The method may include providing the at least one lens proximate to the distal end. The providing may include providing a first lens proximate to the head, and providing a second lens proximate to the distal end.

In at least one embodiment, the method includes providing the at least one optical component as a fiber optic member extending along at least a portion of a length of the fastener. In at least one embodiment, the method includes providing the at least one optical component as a fiber optic member extending through a central channel of the fastener that extends between the head and the distal end, and a lens proximate to the head or the distal end, wherein the lens is configured to focus light into a light-receiving end of the fiber optic member. The method may also include separating the fiber optic member from the lens within the central channel by a space.

The method may also include providing an imaging device coupler that is configured to removably couple to a portion of an imaging device on one or both of the head or the distal end.

Certain embodiments of the present disclosure provide a window system that includes a panel that includes an exterior surface and an interior surface, and a fastener extending between the exterior surface and the interior surface of the panel. The fastener includes at least one optical component that is configured to allow light to pass through the fastener. A screen is coupled to the interior surface. The screen receives light from the at least one optical component of the fastener.

In at least one embodiment, the fastener further includes a head that is configured to be engaged by a tool, and a shaft extending from the head. The shaft includes a distal end that is opposite from the head. The at least one optical component is coupled to one or both of the head or the shaft. The at least one optical component is configured to allow light to pass through the fastener.

In at least one embodiment, the screen is spaced apart from the fastener. In at least one embodiment, the window system also includes an imaging device between the fastener and the screen. The imaging device may include a charge coupled device (CCD) array.

The at least one optical component may include at least one lens. The at least one lens may be proximate to a head of the fastener. The at least one lens may be proximate to a distal end of the fastener. In at least one embodiment, the at least one lens includes a first lens proximate to a head of the fastener, and a second lens proximate to a distal end of the fastener.

The at least one optical component may include a fiber optic member extending along at least a portion of a length of the fastener. The at least one optical component may include a fiber optic member extending through a central channel of the fastener that extends between a head and a distal end, and a lens proximate to the head or the distal end. The lens is configured to focus light into a light-receiving end of the fiber optic member. The fiber optic member may be separated from the lens within the central channel by a space.

One or both of a head or a distal end of the fastener may include an imaging device coupler that is configured to removably couple to a portion of an imaging device.

Certain embodiments of the present disclosure provide a method of forming a window system. The method includes providing a panel that includes an exterior surface and an interior surface, providing a fastener with at least one optical component that is configured to allow light to pass through the fastener, extending the fastener between the exterior surface and the interior surface of the panel, coupling a screen to the interior surface, and receiving light at the screen from the at least one optical component of the fastener.

The method may include spacing the screen apart from the fastener. The method may include disposing an imaging device between the fastener and the screen.

Certain embodiments of the present disclosure provide an aircraft including a fuselage defining an interior cabin The fuselage includes a window system including at least panel that includes an exterior surface and an interior surface. At least one fastener extends between the exterior surface and the interior surface of the panel. The at least one fastener includes at least one optical component that is configured to allow light to pass through the at least one fastener. At least one screen is coupled to the interior surface. The at least one screen receives light from the at least one optical component of the at least one fastener.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition may include additional elements not having that condition.

Certain embodiments of the present disclosure provide a fastener including a head configured to be engaged by a tool and a shaft extending from the head. The shaft includes a distal end that is opposite from the head. At least one optical component is coupled to one or both of the head or the shaft. The optical component(s) provide the fastener with a light-transparent core that allows light to pass therethrough.

Certain embodiments of the present disclosure provide a window system including a panel (which may form part of a fuselage of an aircraft, for example) having an exterior surface and an opposite interior surface. A fastener including at least one optical component extends through the panel through the exterior surface and the interior surface. A screen is disposed proximate to the interior surface opposite from the exterior surface. The optical component(s) of the fastener receives light from outside of the panel and directs the light onto the screen, where images from the outside are viewable. In this manner, window openings need not be formed through the panel. Therefore, the structural integrity of the panel is maintained, while the window system is efficiently manufactured without the need for window openings formed through the panel, window frames, and numerous fasteners.

Figure 1:
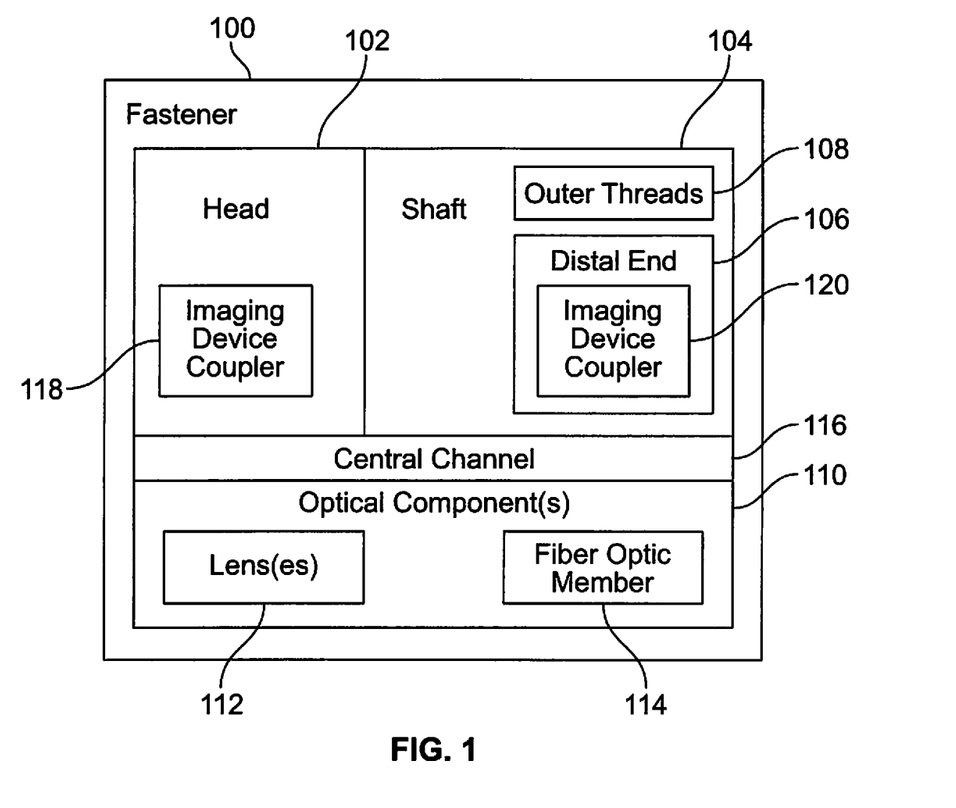
FIG. 1 illustrates a schematic block diagram of a fastener, according to an embodiment of the present disclosure.

FIG. 1 illustrates a schematic block diagram of a fastener 100, according to an embodiment of the present disclosure. The fastener 100 includes a head 102 integrally formed with a shaft 104. In at least one embodiment, the fastener 100 is a bolt or screw. In at least one other embodiment, the fastener 100 is a nail or rivet.

The shaft 104 includes a distal end 106 that is opposite from the head 102. In at least one embodiment, outer threads 108 extend from at least a portion of an exterior surface of the shaft 104. Optionally, the shaft 104 may not include the outer threads 108. The head 102 is configured to be engaged by a tool, such as a screw driver, wrench, socket wrench, power tool, or the like to drive or otherwise move the shaft 104 to securely connect to a structure, such as a panel.

The fastener 100 also includes at least one optical component 110 coupled to one or both of the head 102 or the shaft 104. The optical component 110 includes one or both of a lens 112 or a fiber optic member 114, such as one of more fiber optic strands, threads, bundles, wires, or the like. The fiber optic member 114 is routed through at least a portion of a length of the fastener 100. In at least one embodiment, the optical component 110 includes the lens 112 secured to the head 102 within a central channel 116 formed through the fastener 100. In at least one other embodiment, the optical component 110 includes the lens 112 secured to the shaft 104 proximate to the distal end 106 within the central channel 116 formed through the fastener 100. In at least one other embodiment, the optical component 110 includes the fiber optic member 114 extending through the central channel 116. The fiber optic member 114 may extend within the central channel 116 between and through the head 102 and the distal end 106. Optionally, the fiber optic member 114 may not extend fully between one or both of the head 102 or the distal end 106. Instead, an open space may be formed between at least one end of the fiber optic member 114 within the central channel 116.

The lens(es) 112 and the fiber optic members 114 may be sealingly secured within the central channel 116, such as through one or more adhesives. As another example, the lens(es) 112 and the fiber optic members 114 may be secured within the central channel 116, such as through an interference fit.

In at least one embodiment, the optical components 110 include at least one lens 112, such as secured to the head 102 or the distal end 106, coupled to the fiber optic member 114 that extends through the central channel 116. For example, the lens 112 is secured to the head 102 and focuses light onto an end of the fiber optic member 114, which extends to the distal end 106. In this manner, light is received by the lens 112 at the head 102 and directed through the shaft 104 to and through the distal end 106 via the fiber optic member 114.

In at least one other embodiment, the lens 112 is secured to the distal end 106 and focuses light onto an end of the fiber optic member 114, which extends to the head 102. As such, light is received by the lens 112 at the distal end 106 and directed through the shaft 104 to and through the head 102 via the fiber optic member 114.

As another example, the optical components 110 include a first lens 112 at the head, a second lens 112 at the distal end 106, and the fiber optic member 114 extending between the first lens 112 and the second lens 112. In each embodiment that includes at least one lens 112 and the fiber optic member 114, the lens(es) 112 may be spaced apart from at least one end of the fiber optic member 114, such as approximately a focal length of the lens(es) 112 so that the lens(es) 112 focus the light into the end(s) of the fiber optic member 114. Alternatively, the lens(es) 112 may abut into end(s) of the fiber optic member 114.

In operation, the optical component(s) 110 direct light through the fastener 100, thereby allowing viewing through the fastener 100. As such, the fastener 100 may be used to secure various structures together and allow for viewing into interior portions of a system without the need for removal of one or more structures. The fiber optic member 114 allows light to be output therethrough in order to illuminate an object, as well as capture light energy reflected off of the object.

In at least one embodiment, an imaging device may be removably coupled to the head 102 and/or the distal end 106 to receive the light that is directed through the fastener 100 via the optical component(s) 110. For example, an imaging device, such as a camera, a charge coupled device (CCD) array, or the like may be removably coupled to the fastener 100 to receive the light directed through the fastener 100 via the optical component(s) 110. In at least one embodiment, the head 102 includes an imaging device coupler 118 and the distal end 106 includes an imaging device coupler 120 that are configured to removably couple to a portion of the imaging device, such as a lens and/or adapter of the imaging device. For example, the portion of the imaging device may clamp, or thread around the imaging device coupler(s) 118 or 120, such as through a reciprocal clamping or threadable interface. As another example, the imaging device coupler(s) 118 or 120 may be or include sockets or plugs that removably couple to reciprocal portions of the imaging device. Optionally, the fastener 100 may include only one of the imaging device couplers 118 or 120. Also, optionally, the fastener 100 may not include the imaging device couplers 118 and 120.

Figure 2:
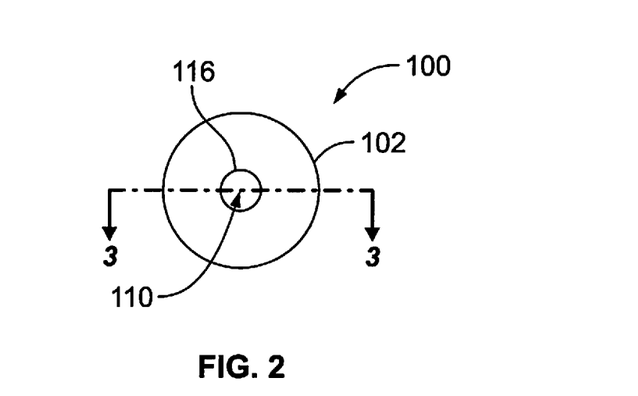
FIG. 2 illustrates an end view of the fastener.

FIG. 2 illustrates an end view of the fastener 100. Referring to FIGS. 1 and 2, in at least one embodiment, the central channel 116 is formed through a length of the fastener 100 between and through the head 102 and the distal end 106. The optical component(s) 110 are secured within the central channel 116. As noted, the optical component(s) 110 may be sealingly secured within the central channel 116 through one or more adhesives.

Figure 3:
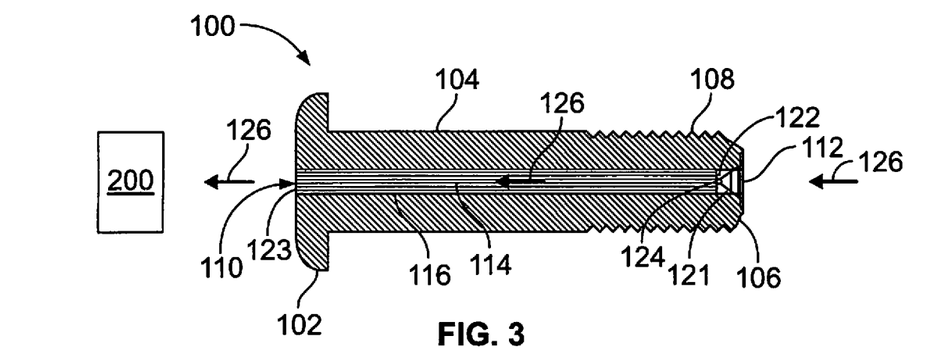
FIG. 3 illustrates cross-sectional view of the fastener through line 3-3 of FIG. 2, according to an embodiment of the present disclosure.

FIG. 3 illustrates cross-sectional view of the fastener 100 through line 3-3 of FIG. 2, according to an embodiment of the present disclosure. In this embodiment, a lens 112 is secured to the distal end 106 within and/or axially aligned with the central channel 116. A fiber optic member 114 extends within the central channel 116 from and through the head 102 towards the distal end 106. The fiber optic member 114 may not abut into the lens 112. Instead, a light-receiving end 121 of the fiber optic member 114 is separated (for example, spaced apart) from the lens 112 within the central channel 116 by a space 122. The space 122 is sized such that the focal point 124 of the lens 112 is proximate to the light-receiving end 121 of the fiber optic member 114. As such, light 126 is received by the lens 112 at the distal end 106, directed into the light-receiving end 121 of the fiber optic member 114 by the lens 112, travels through a length of the fiber optic member 114, and passes out of the fiber optic member 114 at a light-delivery end 123 of the fiber optic member 114 at the head 102. The light 126 may be viewed as it passes out of the light-delivery end 123. For example, an imaging device 200 (such as a CCD array, camera, or the like) may receive the light 126. As noted, the imaging device 200 may be removably coupled to the head 102.

Figure 4:
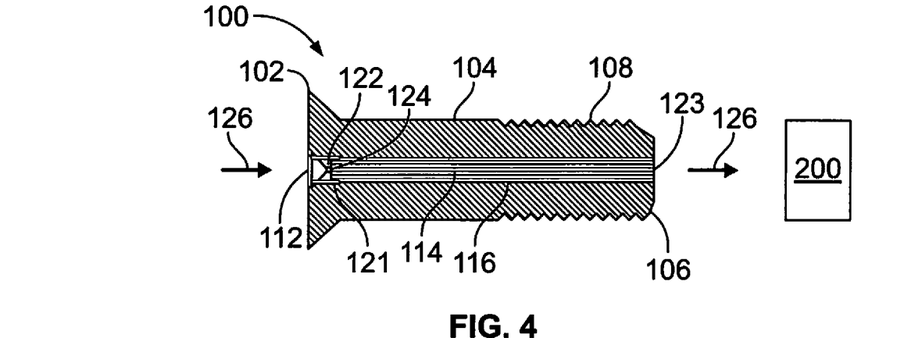
FIG. 4 illustrates a lateral view of the fastener through line 3-3 of FIG. 2, according to an embodiment of the present disclosure.

FIG. 4 illustrates a lateral view of the fastener 100 through line 3-3 of FIG. 2, according to an embodiment of the present disclosure. In this embodiment, a lens 112 is secured to the head 102 within and/or axially aligned with the central channel 116. A fiber optic member 114 extends within the central channel 116 from and through the distal end 106 towards the head 102. The fiber optic member 114 may not abut into the lens 112. Instead, the light-receiving end 121 of the fiber optic member 114 is separated (for example, spaced apart) from the lens 112 within the central channel 116 by a space 122. The space 122 is sized such that the focal point 124 of the lens 112 is proximate to the light-receiving end 121 of the fiber optic member 114. As such, light 126 is received by the lens 112 at the head 102, directed into the light-receiving end 121 of the fiber optic member 114 by the lens 112, travels through a length of the fiber optic member 114, and passes out of the fiber optic member 114 at the light-delivery end 123 of the fiber optic member 114 at the distal end 106. The light 126 may be viewed as it passes out of the light-delivery end 123, such as via the imaging device 200.

In at least one embodiment, the fastener 100 may include a first lens 112 at the distal end 106, as shown in FIG. 3, and a second lens 112 at the head 102, as shown in FIG. 4. The fiber optic member 114 extends between the first lens 112 and the second lens 112.

Figure 5:
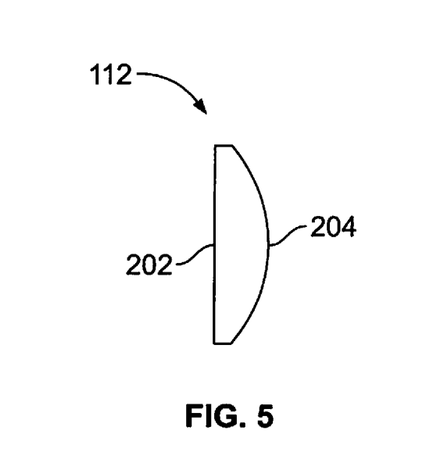
FIG. 5 illustrates a lateral view of a lens, according to an embodiment of the present disclosure.

FIG. 5 illustrates a lateral view of a lens 112, according to an embodiment of the present disclosure. In at least one embodiment, the lens 112 includes a flat light-receiving surface 202 connected to a convex light-focusing surface 204. The flat light-receiving surface 202 may provide a flush surface when the lens 112 is secured within the central channel 116 (shown in FIG. 104).

Figure 6:
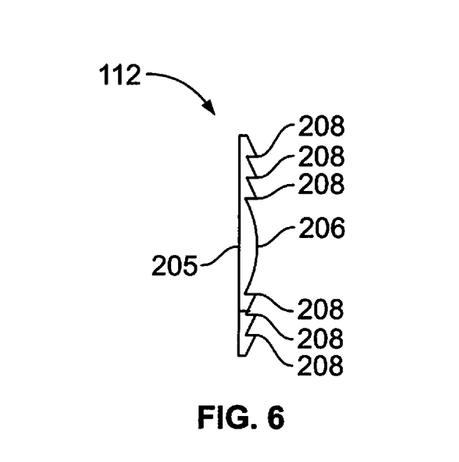
FIG. 6 illustrates a lateral view of a lens, according to an embodiment of the present disclosure.

FIG. 6 illustrates a lateral view of a lens 112, according to an embodiment of the present disclosure. In this embodiment, the lens 112 is a Fresnel lens having a flat light-receiving surface 205 connected to a light-focusing surface 206 having a plurality of grooves 208.

FIGS. 5 and 6 show examples of lenses 112 that may be used with embodiments of the present disclosure. It is to be understood that various other types of lenses 112 that are sized and shaped in a different manner than as shown in FIGS. 5 and 6 may be used.

Figure 7A:
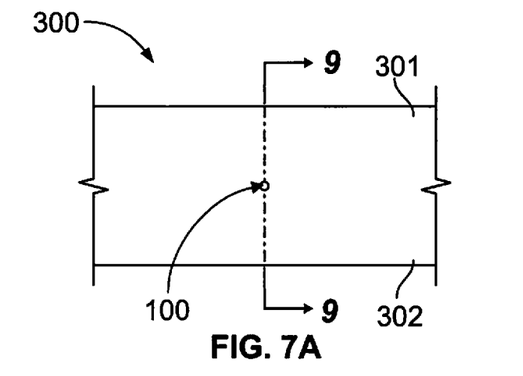
FIG. 7A illustrates an exterior surface of a window system, according to an embodiment of the present disclosure.

FIG. 7A illustrates an exterior surface 301 of a window system 300, according to an embodiment of the present disclosure. The window system 300 includes a panel 302 that includes the exterior surface 301. The panel 302 forms part of a structure, such as a fuselage or wall portion of a vehicle, such as an aircraft.

Figure 8:
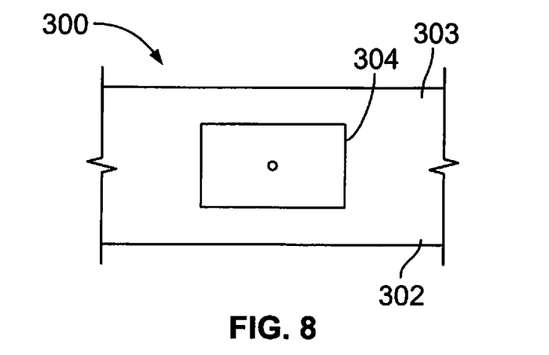
FIG. 8 illustrates an interior surface of the window system, according to an embodiment of the present disclosure.

A fastener 100, such as any of those described above, is secured to the panel 302, and extends therethrough from the exterior surface 301 to an interior surface 303 (shown in FIG. 8). Referring to FIGS. 1 and 7A, the fastener 100 is configured to receive light from outside of the panel 302, and direct the light through the panel 302 via the optical component(s) 110, as described herein.

Figure 7B:
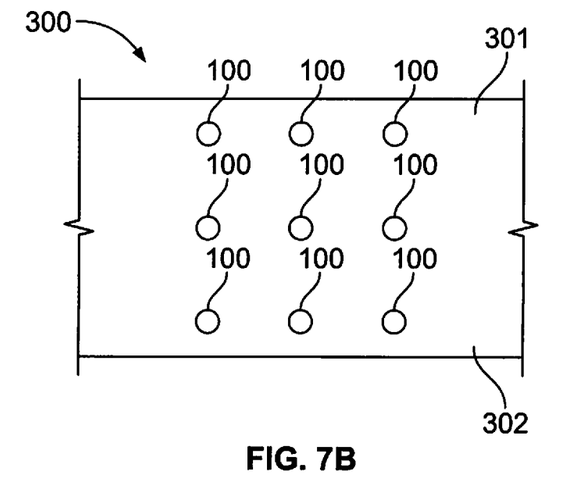
FIG. 7B illustrates an exterior surface of a window system, according to an embodiment of the present disclosure.

FIG. 7B illustrates an exterior surface 301 of a window system 300, according to an embodiment of the present disclosure. The window system 300 includes a panel 302 that includes the exterior surface 301. The panel 302 forms part of a structure, such as the fuselage or wall portion of a vehicle, such as an aircraft.

In at least one embodiment, a plurality of fasteners 100, such as any of those described above, are secured to the panel 302, and extend therethrough from the exterior surface 301 to an interior surface (such as the interior surface 303 shown in FIG. 8). Referring to FIGS. 1 and 7B, the fasteners 100 are configured to receive light from outside the panel 302, and direct the light through the panel 302 via the optical component(s) 110, as described herein.

Referring to FIGS. 7A and 7B, the window system 300 may include one fastener 100, or a plurality of fasteners 100. The window system 300 may include more or less fasteners 100 than shown in FIG. 7B.

FIG. 8 illustrates the interior surface 303 of the window system 300, according to an embodiment of the present disclosure. A screen 304, such as formed of glass, transparent plastic, or the like, is coupled to the interior surface 303. In at least one embodiment, the screen 304 is retained within a frame that is connected to the interior surface 303. In at least one other embodiment, the screen 304 is directly coupled to the interior surface 303 without the use of a frame. Referring to FIGS. 1, 7A, and 8, the screen 304 proximate to the fastener 100 receives light that is directed from outside of the window system 300 towards the interior surface 303 via the optical component(s) 110.

As shown in FIG. 8, each fastener 100 may be associated with the screen 304. In at least one other embodiment, a plurality of fasteners 100, as shown in FIG. 7A, may be associated with (for example, coupled to) the screen 304. In at least one other embodiment, each of the plurality of fasteners 100 may be associated with separate and distinct screens 304. In at least one other embodiment, multiple fasteners 100, such as a subset of those shown in FIG. 7B, may be associated with one screen 304, while another subset of fasteners 100 is associated with another screen 304.

In at least one embodiment, the screen 304 may form a window-like structure on the interior surface 303. Multiple screens 304 may be formed and separated on one or more panels 302. In at least one embodiment, a single screen may longitudinally extend over one or more panels 302, such as within an interior cabin of an aircraft, and be coupled to multiple fasteners 100, as described herein. In such an embodiment, an interior cabin of an aircraft may provide a single, long window or screen that extends over at least a portion of a length of the interior cabin.

Figure 9:
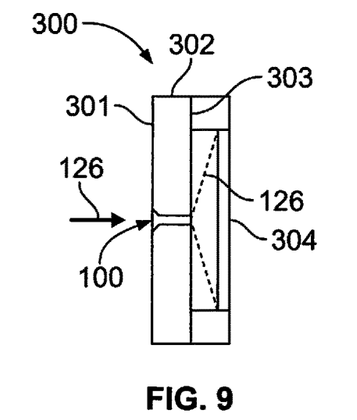
FIG. 9 illustrates a cross-sectional view of the window system through line 9-9 of FIG. 7A, according to an embodiment of the present disclosure.

FIG. 9 illustrates a cross-sectional view of the window system 300 through line 9-9 of FIG. 7A, according to an embodiment of the present disclosure. As shown, the screen 304 may be spaced apart from the fastener 100. Referring to FIGS. 1 and 7A-9, light 126 from outside of the panel 302 is directed and focused onto the screen 304 via the optical component(s) 110 of the fastener(s) 100. As such, light from outside of the panel 302 is viewable on the screen 304.

The window system 300 may replace standard windows assemblies positioned through a fuselage of an aircraft, for example. Standard window assemblies include large cutouts in the fuselage, and typically increase aircraft weight, manufacturing expense, and maintenance considerations. As such, the window system 300 provides a light, inexpensive system that does not affect the structural integrity of the fuselage and reduces maintenance considerations.

Figure 10:
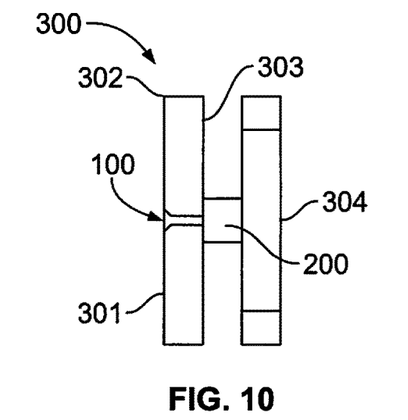
FIG. 10 illustrates a cross-sectional view of the window system through line 9-9 of FIG. 7A, according to an embodiment of the present disclosure.

FIG. 10 illustrates a cross-sectional view of the window system 300 through line 9-9 of FIG. 7A, according to an embodiment of the present disclosure. In this embodiment, an imaging device 200 (such as a CCD array, a camera, a light processing system, or the like) receives the light from the fastener 100 (or fasteners 100) and directs the light (including images) onto the screen 304 for viewing by an individual. The window system 300 may include more than one fastener 100. For example, a plurality of fasteners 100 may extend through the panel 302 and direct light onto the screen 304.

Figure 11:
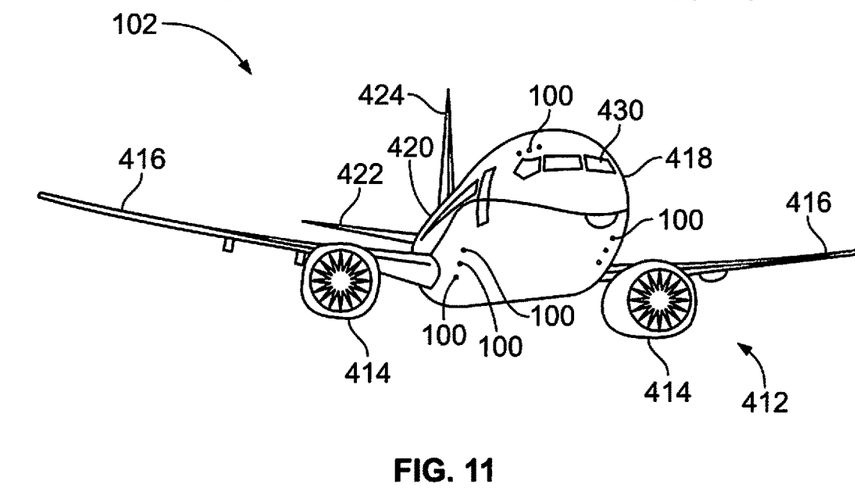
FIG. 11 illustrates a front perspective view of an aircraft, according to an exemplary embodiment of the present disclosure.

FIG. 11 illustrates a front perspective view of an aircraft 400, according to an exemplary embodiment of the present disclosure. The aircraft 400 includes a propulsion system 412 that may include two turbofan engines 414, for example. Optionally, the propulsion system 412 may include more engines 414 than shown. The engines 414 are carried by wings 416 of the aircraft 400. In other embodiments, the engines 414 may be carried by a fuselage 418 and/or an empennage 420. The empennage 420 may also support horizontal stabilizers 422 and a vertical stabilizer 424. The fuselage 418 of the aircraft 400 defines an internal cabin, which may include a cockpit 430.

The aircraft 400 includes structures that are coupled together through the fasteners 100, as described herein. In at least one embodiment, portions of the fuselage 418 include the window system 300, such as shown and described with respect to FIGS. 7A-10.

The aircraft 400 may be sized, shaped, and configured other than shown in FIG. 4. For example, the aircraft 400 may be a non-fixed wing aircraft, such as a helicopter.

In at least one embodiment, the fasteners 100 are fabricated having common sizes that are currently used to secure structures of the aircraft 400 together. The fasteners 100 of the aircraft 400 allow for gathering of data from previously inaccessible and oftentimes overlooked areas of the aircraft 400. For example, if an area of the aircraft 400 requires inspection, embodiments of the present disclosure provide fasteners that allow for frequent and easy inspection of the area.

Figure 12:
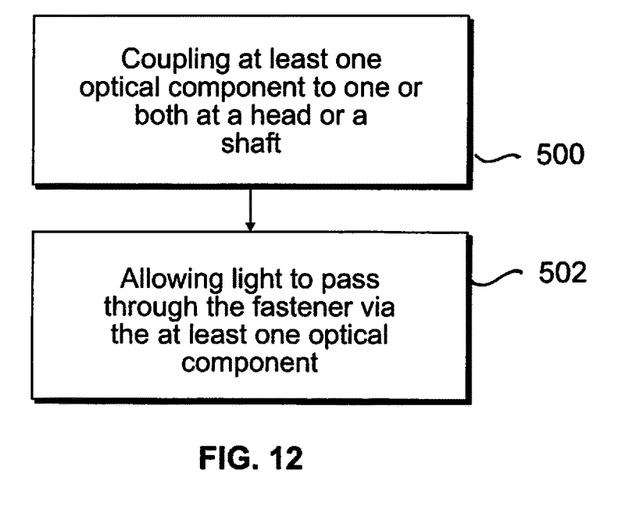
FIG. 12 illustrates a flow chart of a method of forming a fastener, according to an embodiment of the present disclosure.

FIG. 12 illustrates a flow chart of a method of forming a fastener, according to an embodiment of the present disclosure. Referring to FIGS. 1 and 12, the method includes coupling 500 at least one optical component 110 to one or both of a head 102 or a shaft 104. The head 102 is configured to be engaged by a tool. The shaft 104 extends from the head 102, and includes a distal end 106 that is opposite from the head 102. The method also includes allowing 502 light to pass through the fastener 100 via the at least one optical component 110.

In at least one embodiment, the method includes providing the at least one optical component 110 as at least one lens 112. The method may include providing the at least one lens 112 proximate to the head 102. The method may include providing the at least one lens 112 proximate to the distal end 106. The providing may include providing a first lens 112 proximate to the head 102, and providing a second lens 112 proximate to the distal end 106.

In at least one embodiment, the method includes providing the at least one optical component 110 as a fiber optic member 114 extending along at least a portion of a length of the fastener 100. In at least one embodiment, the method includes providing the at least one optical component 110 as a fiber optic member 114 extending through a central channel 116 of the fastener 100 that extends between the head 102 and the distal end 106, and a lens 112 proximate to the head 102 or the distal end 106, wherein the lens 112 is configured to focus light into a light-receiving end of the fiber optic member 114. The method may also include separating the fiber optic member 114 from the lens 112 within the central channel 116 by a space.

The method may also include providing an imaging device coupler that is configured to removably couple to a portion of an imaging device on one or both of the head 102 or the distal end 106.

Figure 13:
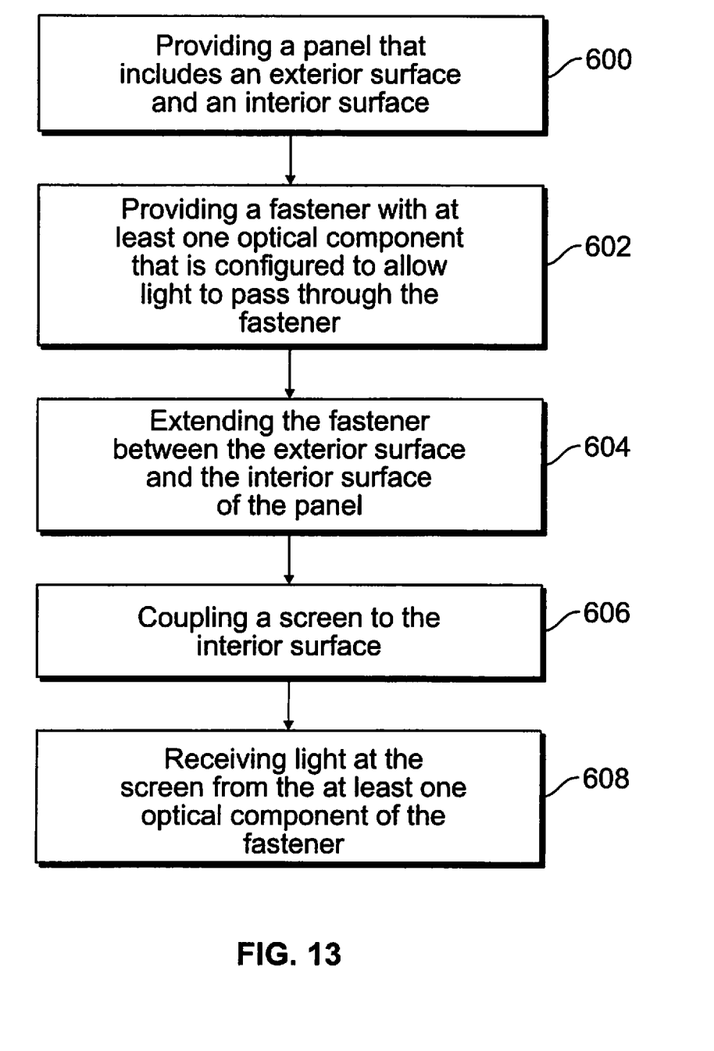
FIG. 13 illustrates a flow chart of a method of forming a window system, according to an embodiment of the present disclosure.

FIG. 13 illustrates a method of forming a window system, according to an embodiment of the present disclosure. Referring to FIGS. 7A-10 and 13, the method includes providing 600 a panel 302 that includes an exterior surface 301 and an interior surface 303, providing 602 a fastener 100 with at least one optical component 110 (shown in FIG. 1) that is configured to allow light to pass through the fastener 100, extending 604 the fastener 100 between the exterior surface 301 and the interior surface 303 of the panel 302, coupling 606 a screen 304 to the interior surface 303, and receiving 608 light at the screen 304 from the at least one optical component 110 of the fastener 100.

The method may include spacing the screen 304 apart from the fastener 100. The method may include disposing an imaging device 200 between the fastener 100 and the screen 304.

As described herein, embodiments of the present disclosure provide fasteners 100 that allow internal portions of structures to be inspected without the need for removing covering portions. Further, the fasteners 100 as described allow for time- and labor-efficient systems and methods for inspecting internal portions structures. Further, embodiments of the present disclosure provide window systems for an aircraft that maintain a high degree of structural integrity and which may be efficiently manufactured.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

The invention claimed is:

1. A fastener comprising:
   a head that is configured to be engaged by a tool;
   a shaft extending from the head, wherein the shaft includes a distal end that is opposite from the head; and
   at least one optical component coupled to one or both of the head or the shaft, wherein the at least one optical component is configured to allow light to pass through the fastener, wherein the at least one optical component comprises at least one lens proximate to the head.

2. The fastener of claim 1, wherein the at least one lens comprises:
   a first lens proximate to the head; and
   a second lens proximate to the distal end.

3. The fastener of claim 1, wherein the at least one optical component further comprises a fiber optic member extending along at least a portion of a length of the fastener.

4. The fastener of claim 1, wherein the at least one optical component further comprises:
   a fiber optic member extending through a central channel of the fastener that extends between the head and the distal end,
   wherein the at least one lens is configured to focus light into a light-receiving end of the fiber optic member.

5. The fastener of claim 4, wherein the fiber optic member is separated from the lens within the central channel by a space.

6. The fastener of claim 1, wherein one or both of the head or the distal end comprises an imaging device coupler that is configured to removably couple to a portion of an imaging device.

7. The fastener of claim 1, wherein the fastener is one of a bolt, a screw, a nail, or a rivet.

8. The fastener of claim 1, wherein the head is configured to be engaged by the tool to connect the fastener to a structure.

9. A method of forming a fastener comprising:
   coupling at least one optical component including at least one lens proximate to a head, wherein the head is configured to be engaged by a tool, wherein a shaft extends from the head, and wherein the shaft includes a distal end that is opposite from the head; and
   allowing light to pass through the fastener via the at least one optical component.

10. The method of claim 9, wherein the coupling comprises:
    providing a first lens proximate to the head; and
    providing a second lens proximate to the distal end.

11. The method of claim 9, wherein the at least one optical component further comprises a fiber optic member extending along at least a portion of a length of the fastener.

12. The method of claim 9, wherein the at least one optical component further comprises a fiber optic member extending through a central channel of the fastener that extends between the head and the distal end, wherein the at least one lens is configured to focus light into a light-receiving end of the fiber optic member.

13. The method of claim 12, further comprising separating the fiber optic member from the lens within the central channel by a space.

14. The method of claim 9, further comprising providing an imaging device coupler that is configured to removably couple to a portion of an imaging device on one or both of the head or the distal end.

15. The method of claim 9, wherein the fastener is one of a bolt, a screw, a nail, or a rivet.

16. The method of claim 9, wherein the head is configured to be engaged by the tool to connect the fastener to a structure.

17. A fastener comprising:
    a head that is configured to be engaged by a tool;
    a shaft extending from the head, wherein the shaft includes a distal end that is opposite from the head; and
    a fiber optic member extending through a central channel of the fastener that extends between the head and the distal end;
    at least one lens proximate to the head, wherein the at least one lens is configured to focus light into a light-receiving end of the fiber optic member, wherein the fiber optic member and the at least one lens are configured to allow light to pass through the fastener, and wherein the fiber optic member is separated from the at least one lens within the central channel by a space; and
    at least one imaging device coupler formed on one or both of the head or the distal end that is configured to removably couple to a portion of an imaging device.

18. The fastener of claim 17, wherein the at least one lens comprises:
    a first lens proximate to the head; and
    a second lens proximate to the distal end.

19. The fastener of claim 17, wherein the fastener is one of a bolt, a screw, a nail, or a rivet.

20. The fastener of claim 17, wherein head is configured to be engaged by the tool to connect the fastener to a structure.

* * * * *